No. 800,151. PATENTED SEPT. 26, 1905.
W. T. HANNA.
RUNNING GEAR FOR VEHICLES.
APPLICATION FILED FEB. 11, 1905.

2 SHEETS—SHEET 1.

Witnesses
C. W. Miles,
A. McCormack.

Inventor
William T. Hanna
By Walter F. Murray
Attorney

No. 800,151. PATENTED SEPT. 26, 1905.
W. T. HANNA.
RUNNING GEAR FOR VEHICLES.
APPLICATION FILED FEB. 11, 1905.

2 SHEETS—SHEET 2.

Witnesses
C. W. Miles.
N. McCormack.

Inventor
William T. Hanna
By Walter F. Murray
Attorney

UNITED STATES PATENT OFFICE.

WILLIAM T. HANNA, OF CINCINNATI, OHIO, ASSIGNOR TO MARTHA A. HANNA, OF CINCINNATI, OHIO.

RUNNING-GEAR FOR VEHICLES.

No. 800,151.          Specification of Letters Patent.          Patented Sept. 26, 1905.

Application filed February 11, 1905. Serial No. 245,177.

*To all whom it may concern:*

Be it known that I, WILLIAM T. HANNA, a citizen of the United States of America, and a resident of Cincinnati, county of Hamilton, State of Ohio, have invented certain new and useful Improvements in Running-Gear for Vehicles, of which the following is a specification.

The object of my invention is a running-gear for vehicles which may be quickly and readily operated to regulate the direction of the motion of the vehicle with the least liability of overturning it. This object is attained by the means described in the specification and illustrated in the accompanying drawings, in which—

Figures 1, 2, 6:
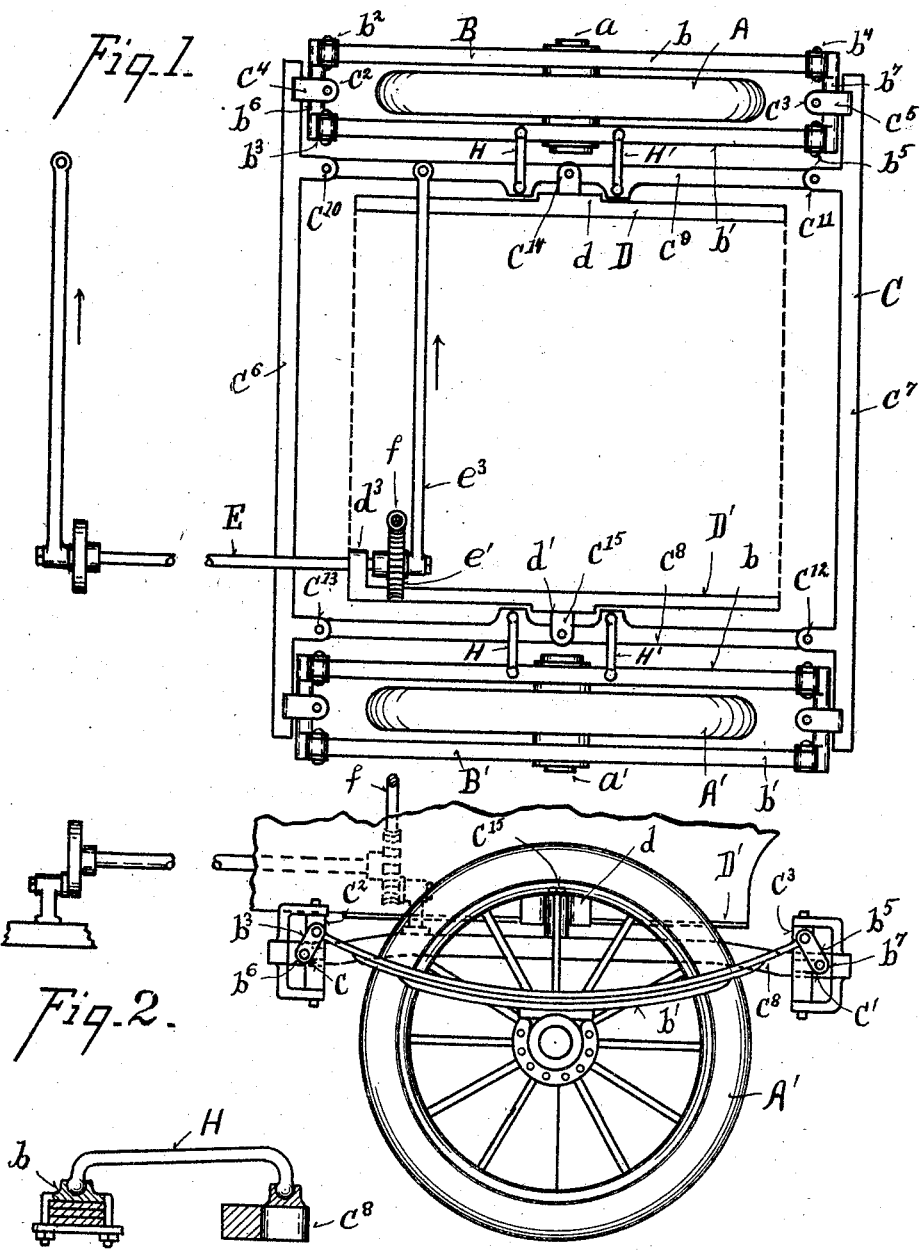
Figure 3:
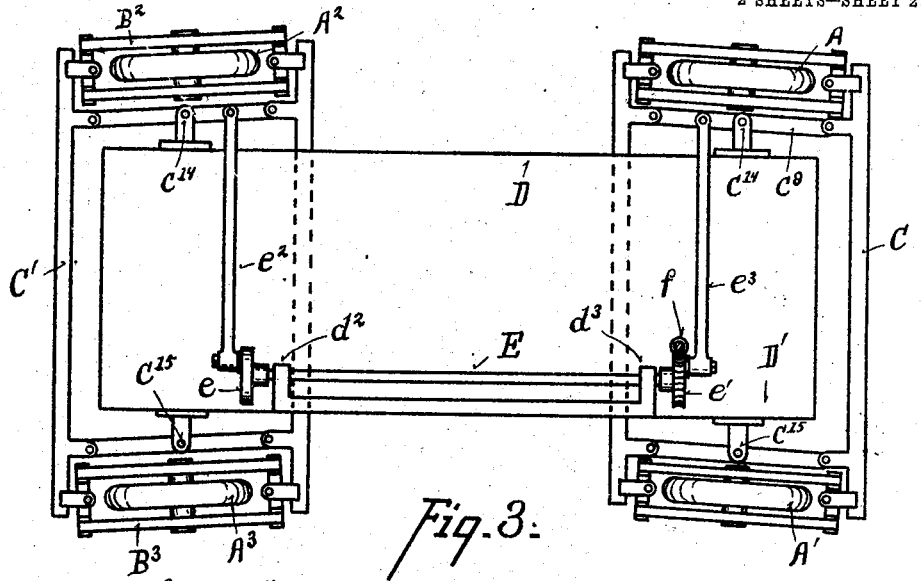
Figure 5:
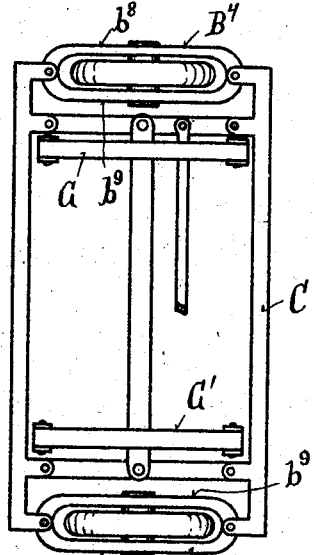
Figure 4:
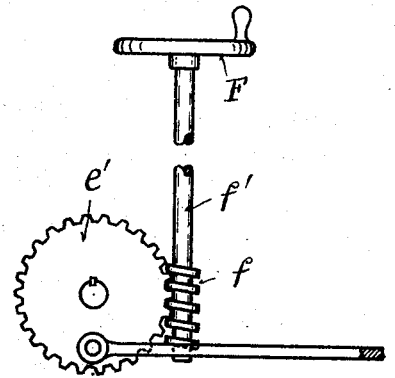

Figure 1 is a plan view of the running-gear for the front wheels of the vehicle, showing the steering connection between the front and the rear wheels. Fig. 2 is a side elevation of the parts shown in Fig. 1. Fig. 3 is a plan view, upon a reduced scale, showing the complete running-gear of the vehicle. Fig. 4 is a detail elevation of the steering mechanism. Fig. 5 is a plan view of a modified form of gear. Fig. 6 is a detail view of reinforcing-rod.

The front wheels A A' are journaled upon short stud-shafts $a$ $a'$, which are secured in rigid frames B B'. Frames B B' are similar in construction, and a detailed description need be given only of one of them, and similar reference-letters may be used for the parts of each. In the form shown in Fig. 1 the side members of these frames consist of springs $b$ $b'$, which are journaled at their ends to links $b^2$, $b^3$, $b^4$, and $b^5$, said links being pivoted at their lower ends to horizontal bolts $b^6$ $b^7$, which are themselves secured in lugs $c$ $c'$, projecting from journal-pins $c^2$ $c^3$. Journal-pins $c^2$ $c^3$ are journaled in lugs $c^4$ $c^5$, which project inwardly from the outer projecting ends of parallel arms $c^6$ $c^7$ of frame C, which is in the form of a parallel ruler.

Frame C consists of longitudinal arms $c^8$ $c^9$ and transverse arms $c^6$ $c^7$, which arms are pivoted together at the points $c^{10}$, $c^{11}$, $c^{12}$, and $c^{13}$. Arms $c^8$ $c^9$ have central upwardly-projecting pivot-studs $c^{14}$ $c^{15}$, which enter journal-boxes $d$ $d'$, secured upon the rigid members D D' of the vehicle-body.

The rear wheels $A^2$ $A^3$ are journaled in frames $B^2$ $B^3$, similar to frames B B', and said frames are journaled in a movable frame C' resembling frame C in the same manner as described for the front running-gear.

I will now describe the steering mechanism.

Journaled in lugs $d^2$ $d^3$ of the frame D D' is a longitudinal rotatable rod E, which at its outer ends carries pinions $e$ $e'$, which are coupled, by means of arms $e^2$ $e^3$, to one of the longitudinal rods of the frame C—viz., rod $c^9$ of frame C and the corresponding rod in frame C'. Pinion $e'$ meshes with the worm $f$ upon the shaft $f'$ of the pilot-wheel F.

In the modification shown in Fig. 5 the frames $B^4$ $B^5$, corresponding to frames B B', are made of inelastic members $b^8$ $b^9$. Springs G G' for supporting the vehicle-body rest upon frames corresponding to frames C C'.

In operation the rotation of the pilot-wheel is communicated to the pinions $e$ $e'$, which draw the arms $e^2$ $e^3$ either toward the pinions or push them away therefrom. This causes the frames C C' to be rotated about the pivot-points $c^{14}$ $c^{15}$ and changes the direction of the frames B, B', $B^2$, and $B^3$. The rods $e^2$ $e^3$ being secured one upon the right and the other upon the left of the pivot-points $c^{14}$ the rotations imparted to the frames B B' are the reverse of each other, as shown in Fig. 3, to enable the vehicle to turn curves more readily.

Frames B B' are reinforced against torsional strains by rods H H', which are pivoted to rods $b$ and $b'$ and arms $c^8$ $c^9$, upon opposite sides of pivot-points $c^{14}$ and $c^{15}$.

What I claim is—

1. In a running-gear for vehicles the combination of a frame consisting of longitudinal and transverse arms pivoted together at the corners, rigid frames swiveled to the ends of the movable frame, wheels journaled in the rigid frames, and means for changing the angles between the sides of the movable frame, substantially as shown and described.

2. In a running-gear for vehicles the combination of a flexible frame consisting of longitudinal and transverse bars pivoted together at the corners, the transverse bars projecting upon each side beyond the longitudinal bars, rigid frames swiveled to the said projecting ends of the flexible frame, wheels journaled in the rigid frames and means for changing the relative positions of the sides of the flexible frame, substantially as shown and described.

3. In a running-gear for vehicles the combination of a flexible frame consisting of longitudinal and transverse bars pivoted together at the corners, the transverse bars projecting beyond the ends of the longitudinal bars, pins journaled in the projecting ends of the transverse bars, rigid frames coupled to the journal-pins, wheels journaled in the rigid frames, and means for changing the relative positions of the sides of the flexible frame, substantially as shown and described.

4. In a running-gear for vehicles the combination of a flexible frame consisting of longitudinal and transverse bars pivoted together at the corners, the transverse bars projecting beyond the ends of the longitudinal bars, pins journaled in the projecting ends of the transverse bars, transverse bolts carried by said pins, links at the ends of the bolts, springs pivoted to the links, wheels journaled between the springs and means for changing the relative positions of the sides of the flexible frames, substantially as shown and described.

5. In a running-gear for vehicles the combination of a front and rear frame each consisting of longitudinal and transverse arms pivoted together at the corners, each frame having rigid frames swiveled to its ends, wheels journaled in the rigid frames, a longitudinal rotatable shaft, pinions secured upon the ends of the shaft, rods coupling one of the pinions with one of the longitudinal members of the front frame, and a rod coupling the other pinion with one of the longitudinal members of the rear frame and a means for rotating the shaft, substantially as shown and described.

6. In a running-gear for vehicles the combination of a front and a rear frame each consisting of longitudinal and transverse arms pivoted together at the corners, journal-pivots centrally located upon the longitudinal members for coupling the same to the vehicle-body, rigid frames swiveled to the ends of the movable frames, wheels journaled in the rigid frames, a longitudinal rotatable rod, a means for rotating the same, pinions secured upon the ends of the rotatable rod, and arms connecting the pinions with the movable frames so that the rotation of the rod imparts an opposite direction of movement to the frames.

WILLIAM T. HANNA.

Witnesses:
W. F. MURRAY,
A. McCORMACK.